L. C. BEARDSLEY.

Sheet-Metal Cans.

No. 6,583. Reissued Aug. 10, 1875.

WITNESSES

W. D. Newman

Robt M. Barr

INVENTOR

Lester C. Beardsley.

By Leggett & Leggett Attorneys.

NORRIS PETERS, INC. LITHO., WASHINGTON, D. C.

UNITED STATES PATENT OFFICE.

LESTER C. BEARDSLEY, OF CLEVELAND, OHIO.

IMPROVEMENT IN SHEET-METAL CANS.

Specification forming part of Letters Patent No. 156,012, dated October 20, 1874; reissue No. 6,583, dated August 10, 1875; application filed February 26, 1875.

DIVISION B.

*To all whom it may concern:*

Be it known that I, LESTER C. BEARDSLEY, of Cleveland, county of Cuyahoga, State of Ohio, have invented a new and useful Improvement in Seams for Cans; and declare the following to be such a full, clear, and exact description thereof as will enable others skilled in the art to which it pertains to make and use it, reference being had to the accompanying drawings, which form a part of this specification.

My invention relates to a double seam for cans; and consists in forming the said seam in a manner substantially as hereinafter set forth and claimed, and is designed for attaching the tops and bottoms to the cans, or to attach the top to a filled can.

Figure 1:
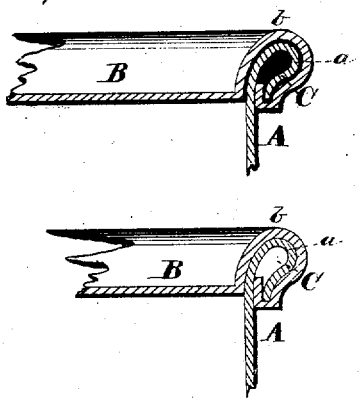
Figure 2:
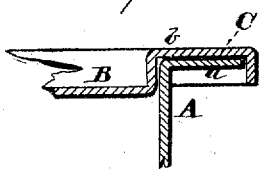
Figure 3:
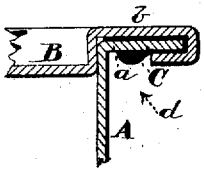
Figure 4:
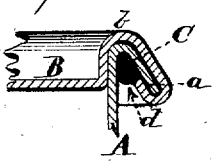

In the drawings, Figure 1 is a sectional view of the can and its top, representing the double seam which is the subject of this invention. Fig. 2 represents the can and its top as they appear before the joint is formed, showing the first stage in forming the said joint. Fig. 3 represents the second stage in forming the said joint. Fig. 4 represents the third stage in forming the said joint.

The final step, which results in a complete joint, is represented by Fig 1.

The material represented in the drawing is exaggerated in dimensions in order to clearly show the invention.

In the different figures similar letters of refence indicate similar parts.

A is the body of the can; B, the top and bottom of the said can. C, indicated in black, is white lead or its equivalent.

To form the double joint, which is the subject-matter of my invention, a can and its top are formed so as, in cross-section, to present the appearance shown in Fig. 2, the can having the flange *a* turned outward at its top or bottom, and the top or bottom B struck up so as to have the projecting flange *b* that extends out beyond the flange *a* when the top is placed upon the can, as indicated in Fig. 2. Before placing the top upon the can, the can is dipped onto a surface of white lead, so that the white lead may form quite a thick film between the two flanges *b a*. The top is then held rigidly to the can in any suitable manner, and the projecting portion of the flange *b* is crimped in around the projecting flange *a*, as shown in cross-section at Fig, 3. This operation will drive white lead from between the two flanges, so that a portion of it will rest in the angle *d*, Fig. 3. The two flanges *a b* are then bent down together to an angle of about forty-five degrees, as shown in Fig. 4, and they are bent in such a manner as to leave an easy curved, instead of a sharp, angle between them, the object being to prevent the material from cracking or breaking. This enables me to use a lower grade of material in forming the can than would have to be used were the edges turned down to a sharp angle. By turning the edge down to a sharp angle a low grade of material would crack and break at the end. The next and final step in forming the double seam is, with a suitable implement, to press the lower end of the flange (shown in Fig. 4) close in against the side of the can until it has assumed the shape shown in Fig. 1. This last operation presses the white lead well up into the bead formed by the curve referred to, leaving a bead or tube, which is filled with the white lead, as shown in Fig. 1, at C, which insures a perfectly tight joint.

I am aware that double seams have been before constructed; but my invention consists in the improvement upon this of a double tubular or beaded seam, and is in contradistinction from a double seam simply.

By the word "tubular" or "beaded" I refer to the space C, which may either be left open, as referred to and as shown in one of the views of Fig. 1, or may be filled with white lead or a wire cord, as shown in the other view of Fig. 1.

I do not confine myself to using the white lead C or any other substance in its place; but a joint may be formed tight enough for many purposes without the employment of any filling between the flanges. In such cases there would be a hollow bead or tubular opening at C, as shown in one of the views in Fig. 1. This beaded or tubular form given to the double seam at its top serves at the same time to give additional strength to the top and bottom of the can to resist any lateral pressure.

What I claim as new, and desire to secure by Letters Patent, is—

1. In combination with the double tubular or beaded seam, the filling C of white lead, substantially as and for the purpose set forth.

2. The process of uniting a top to a can by a tubular or beaded seam and of filling the bead with white lead, consisting, first, of placing a film of white lead on the flange *a;* second, of pressing the overlapping flange *b* upon the same and crimping it over the edge of the flange *a;* and third, of curving the combined flanges downward and pressing the edge against the side of the can, substantially as and for the purpose set forth.

LESTER C. BEARDSLEY.

Witnesses:

FRANCIS TOUMEY,

WELLS W. LEGGETT.